United States Patent [19]

Su

[11] Patent Number: 5,608,603
[45] Date of Patent: Mar. 4, 1997

[54] COMPUTER KEYBOARD WITH CIRCUIT BOARD POSITIONING DEVICE INCLUDING POSITIONING PLATES AND L-SHAPED PLUG UNITS

[75] Inventor: Su Su, Hsin-Tien, Taiwan

[73] Assignee: Shin Jiuh Corp., Taipei Hsien, Taiwan

[21] Appl. No.: 437,686

[22] Filed: May 9, 1995

[51] Int. Cl.$^6$ ................................ H01H 9/00; G06F 1/16
[52] U.S. Cl. ................ 361/680; 248/224.7; 248/225.21; 200/303; 400/472
[58] Field of Search ............................ 248/224.7, 225.21; 341/22; 364/708.1; 345/168–172; 235/145 R; 200/303, 5 A; 361/680; 400/472

[56] References Cited

U.S. PATENT DOCUMENTS

| | | | |
|---|---|---|---|
| 5,284,311 | 2/1994 | Baer | 248/224.7 X |
| 5,428,502 | 6/1995 | Tsai | 361/680 |

Primary Examiner—Michael W. Phillips
Attorney, Agent, or Firm—Kinney & Lange, P.A.

[57] ABSTRACT

A computer keyboard includes a printed circuit board, a rubber plate which is located over the printed circuit board, and a positioning device that positions the printed circuit board and the rubber plate in the keyboard. The positioning device includes an electrically insulating upper positioning plate located over the rubber plate, and a lower positioning plate located under the printed circuit plate. The lower positioning plate includes a plurality of socket units which project upwardly therefrom, and through the holes of the printed circuit board and the holes of the rubber plate. The upper positioning plate includes a plurality of generally L-shaped plug units which project downwardly therefrom, and through the holes of the rubber plate and the holes of the printed circuit board. Each of the L-shaped plug units has a vertical section formed integrally with a plate body of the upper positioning plate, and a horizontal section formed integrally with a lower end of the vertical section. The horizontal sections of the L-shaped plugs are inserted respectively into the socket units of the lower positioning plate.

1 Claim, 3 Drawing Sheets though which are respectively and vertically aligned with the holes of the printed circuit board. The lower positioning plate includes a plate body and a plurality of socket units which project upwardly from the plate body of the lower plate and through the holes of the printed circuit board and the holes of the rubber plate. The upper positioning plate includes a plate body, and a plurality of generally L-shaped plug units which project downwardly from the plate body of the upper plate and through the holes of the rubber plate and the holes of the printed circuit board. Each of the L-shaped plug units has a vertical section formed integrally with the plate body of the upper positioning plate, and a horizontal section formed integrally with a lower end of the vertical section. The horizontal sections of the L-shaped plug units are inserted respectively into the socket units of the lower positioning plate.

COMPUTER KEYBOARD WITH CIRCUIT BOARD POSITIONING DEVICE INCLUDING POSITIONING PLATES AND L-SHAPED PLUG UNITS

BACKGROUND OF THE INVENTION

1. Field of the Invention

The invention relates to a computer keyboard, more particularly to a computer keyboard with an improved circuit board positioning device.

2. Description of the Related Art

A computer keyboard includes a printed circuit board, a rubber plate which is located over the printed circuit board, and two positioning plates which clamp and position the printed circuit board and the rubber plate therebetween. As illustrated in FIG. 1, the positioning device includes an electrically insulating upper positioning plate 11 located over the rubber plate (not shown), and a lower positioning plate 12 located under the printed circuit board (not shown). The upper positioning plate 11 is formed with a plurality of openings 110 and a plurality of horizontal engaging tabs 111 (only one is shown). The tabs 111 project inwardly from an inner peripheral wall of the plate 11, which defines a corresponding one of the openings 110. The lower positioning plate 12 is formed with a plurality of holes 124 and a plurality of engaging tongues 121 (only one is shown). The tongues 121 project through a respective one of the holes 124 of the lower positioning plate 12, and engage a corresponding one of the engaging tabs 111 of the upper positioning plate 11, thereby clamping and positioning the rubber plate and the printed circuit board between the upper and lower positioning plates 11, 12.

Note that, although the engaging tongue 121 is provided with a curved portion 123 that abuts against the corresponding engaging tab 111 in order to prevent disengagement of the latter from the tongue 121, there is no additional element to help press the engaging tongue 121 in a downward direction. Therefore, the tongue 121 fatigues easily at the bent portion 122, and the upper and lower positioning plates 11, 12 may loosen from one another, thus resulting in a poor positioning effect for the printed circuit board.

In addition, when transporting a plurality of the lower positioning plates 12 to an assembly site, the plates 12 cannot be stacked on top of each other, because the tongues 121 may tangle up and press against one another, thereby resulting in deformation of the plates 12.

SUMMARY OF THE INVENTION

Therefore, the object of the present invention to provide a computer keyboard with an improved circuit board positioning device for positioning effectively a printed circuit board.

Accordingly, the computer keyboard of the present invention includes a printed circuit board disposed therein, a rubber plate which is located over the printed circuit board and which has a plurality of resilient contact units, and a positioning device which is constituted by an electrically insulating upper positioning plate located over the rubber plate, and a lower positioning plate located under the printed circuit board so as to clamp the rubber plate and the printed circuit board between the upper and lower positioning plates, thereby positioning the printed circuit board. The printed circuit board has a plurality of holes formed therethrough. The rubber plate has a plurality of holes formed through. The rubber plate has a plurality of holes formed In the preferred embodiment, each of the socket units of the lower positioning plate has two parallel vertical first walls, a vertical second wall which is perpendicular to and interconnects the first walls, and a horizontal top wall which interconnects an upper end portion of the second wall and the upper end portions of the first walls so as to define a plug receiving space under the top wall and between the first walls. The horizontal section of each of the L-shaped plug units of the upper positioning plate has an enlarged intermediate portion which presses against a bottom surface of the top wall of a corresponding one of the socket units of the lower positioning plate so as to clamp and position effectively the rubber plate and the printed circuit board between the upper and lower positioning plates.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
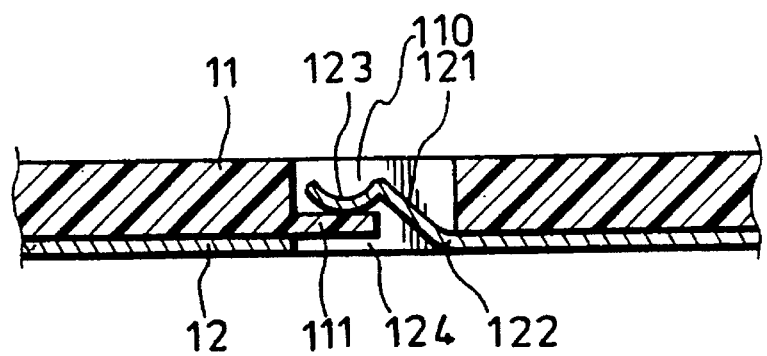
FIG. 1 is a sectional view of a conventional positioning device which is used to position a printed circuit board in a computer keyboard.
Figure 3:
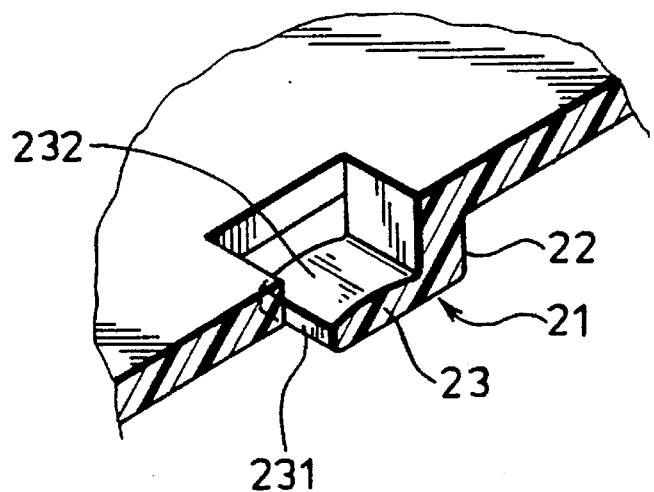
FIG. 3 shows a portion of an upper positioning plate of the keyboard of the present invention taken along line III—III in FIG. 2.
Figure 2:
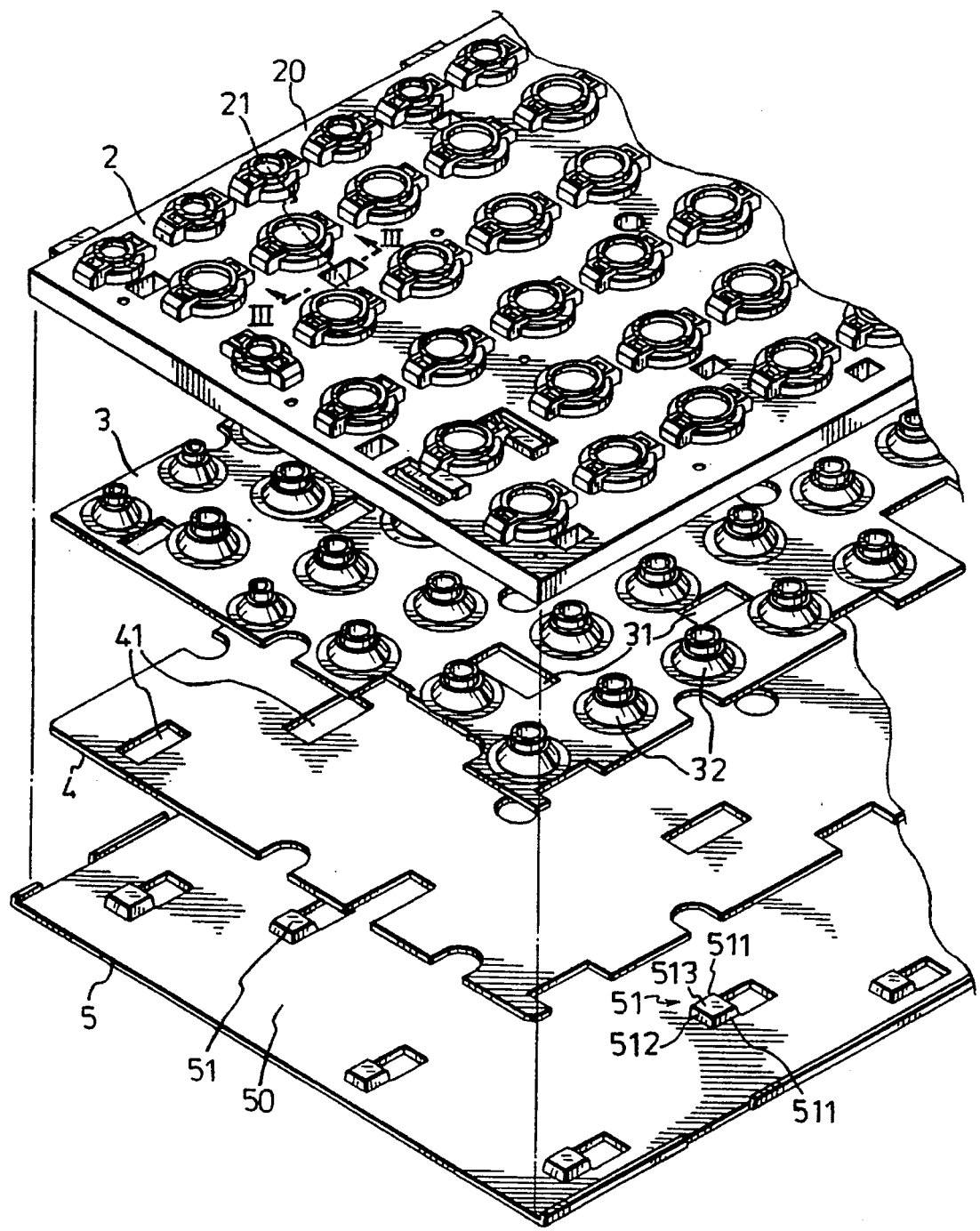
FIG. 2 is an exploded view of the keyboard of the present invention.

Referring to FIGS. 2 and 3, a positioning device of a keyboard of the present invention is used to position a printed circuit board 4 and a rubber plate 3 in a computer keyboard in such a manner that the rubber plate 3 is located over the printed circuit board 4.

As illustrated, the rubber plate 3 has a plurality of resilient contact units 32. The positioning device includes an electrically insulating upper positioning plate 2 which is located over the rubber plate 3, and a lower positioning plate 5 which is located under the printed circuit board 4 so as to clamp and thus position the rubber plate 3 and the printed circuit board 4 between the upper and lower positioning plates 2, 5.

The printed circuit board 4 has a plurality of holes 41 formed therethrough. The rubber plate 3 has a plurality of holes 31 which are formed therethrough and which are aligned respectively and vertically with the holes 41 of the printed circuit board 4.

Figure 4:
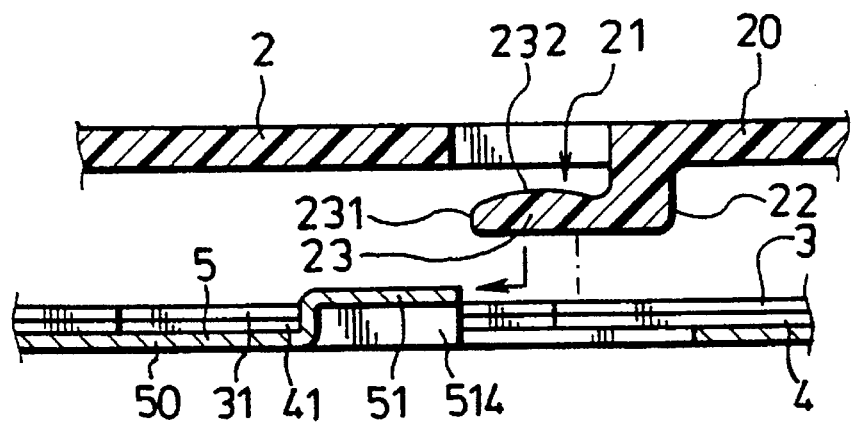
FIG. 4 is a sectional view of the positioning device of the keyboard of the present invention, illustrating how the lower positioning plate of the positioning device and the upper positioning plate are joined together.
Figure 5:
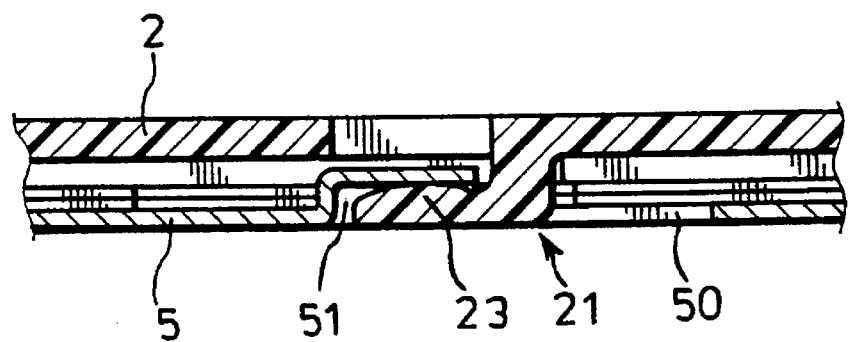
FIG. 5 is a sectional view showing the positioning device of the keyboard of the present invention.

Referring to FIGS. 2, 4 and 5, the lower positioning plate 5 is generally made of metal and includes a plate body 50 and a plurality of socket units 51 that project upwardly from the plate body 50 and through the holes 41 of the printed circuit board 4 and the holes 31 of the rubber plate 3. Each of the socket units 51 of the lower positioning plate 5 has two parallel vertical first walls 511, a vertical second wall 512 which is perpendicular to and which interconnects the first walls 511, and a horizontal top wall 513 which interconnects the upper end portion of the second wall 512 and the upper end portions of the first walls 511, thereby defining a plug receiving space 514 (see FIG. 4) which is located under the top wall 513 and between the first walls 511.

The upper positioning plate 2 is generally made of plastic and includes a plate body 20, and a plurality of generally L-shaped plug units 21 which project downwardly from the plate body 20 and through the holes 31 of the rubber plate 3 and the holes 41 of the printed circuit board 4. Each of the L-shaped plug units 21 has a vertical section 22 formed integrally with the plate body 20 of the upper positioning plate 2, and a horizontal section 23 formed integrally with the lower end of the vertical section 22. The horizontal section 23 of each of the L-shaped plug units 21 of the upper positioning plate 2 has an enlarged intermediate portion 232 so that, when the horizontal sections 23 of the L-shaped plug units 21 are inserted respectively into the plug receiving spaces 514 of the socket units 51 of the lower positioning plate 5, the enlarged portion 232 presses against the bottom surface of the top wall 513 of a corresponding one of the socket units 51. Thus, the rubber plate 3 and the printed circuit board 4 are clamped and positioned effectively between the upper and lower positioning plates 2, 5.

In the assembly of one plug unit 21 and one socket unit 51, the distal end portion 231 of the horizontal section 23 (see FIG. 4) is tapered so as to facilitate the insertion of the horizontal section 23 into the plug receiving space 514 of the lower positioning plate 5. Because the plug unit 21 of the upper positioning plate 2 is located in the socket unit 51 of the lower positioning plate 5, the positioning device of the present invention positions the printed circuit board 3 and the rubber plate 4 effectively in the keyboard.

In addition, the walls 511, 512, 513 of the socket unit 51 provide cooperatively a substantial stiffness which can withstand a heavy load so that a plurality of the lower positioning plates 5 can be stacked during transport without the risk of deforming of the socket units 51.

With the present invention thus explained, it is obvious to those skilled in the art that various modifications and variations can be made without departing from the scope and spirit thereof. It is therefore intended that the present invention be limited only as in the appended claims.

I claim:

1. A computer keyboard including a printed circuit board, a rubber plate which is located in the keyboard and over the printed circuit board and which has a plurality of resilient contact units, and a positioning device which includes an electrically insulating upper positioning plate located over the rubber plate, and a lower positioning plate located under the printed circuit board so as to clamp the rubber plate and the printed circuit board between the upper and lower positioning plates, all of said upper positioning plate, said rubber plate, said printed circuit board and said lower positioning plate being horizontal, wherein the improvement comprises:

said printed circuit board having a plurality of holes formed therethrough;

said rubber plate having a plurality of holes which are formed therethrough and which are aligned respectively and vertically with said holes of said printed circuit board;

said lower positioning plate including a plate body and a plurality of socket units projecting upwardly from said plate of said lower plate and through said holes of said printed circuit board and said holes of said rubber plate; and said upper positioning plate including a plate body, and a plurality of generally L-shaped plug units which project downwardly from said plate body of said upper positioning plate and through said holes of said rubber plate and said holes of said printed circuit board, each of said L-shaped plug units having a vertical section formed integrally with said plate body of said upper positioning plate, and a horizontal section formed integrally with a lower end of said vertical section, said horizontal sections of said L-shaped plug units being inserted respectively into said socket units of said lower positioning plate, wherein each of said socket units of said lower positioning plate has two parallel vertical first walls, a vertical second wall which is perpendicular to and which interconnects said first walls, and a horizontal top wall which interconnects an upper end portion of said second wall and upper end portions of said first walls, thereby defining a plug receiving space under said top wall between said first walls, said horizontal section of each of said L-shaped plug units of said upper positioning plate having an enlarged intermediate portion which presses against a bottom surface of said top wall of a corresponding one of said socket units of said lower positioning plate so as to clamp said rubber plate and said printed circuit board between said upper and lower positioning plates.

* * * * *